(12) United States Patent
Koh et al.

(10) Patent No.: US 12,017,558 B2
(45) Date of Patent: Jun. 25, 2024

(54) SEAT CONTROL DEVICE AND CONTROL METHOD THEREOF

(71) Applicant: HYUNDAI TRANSYS INCORPORATED, Seosan-si (KR)

(72) Inventors: Sang Kyung Koh, Yongin-si (KR); In Gyu Jang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 252 days.

(21) Appl. No.: 17/407,701

(22) Filed: Aug. 20, 2021

(65) Prior Publication Data

US 2022/0134908 A1   May 5, 2022

(30) Foreign Application Priority Data

Oct. 30, 2020   (KR) .................... 10-2020-0143333

(51) Int. Cl.
*B60N 2/02*   (2006.01)
*H02P 5/68*   (2006.01)

(52) U.S. Cl.
CPC ....... *B60N 2/02246* (2023.08); *B60N 2/0244* (2013.01); *H02P 5/68* (2013.01); *B60N 2/0272* (2023.08)

(58) Field of Classification Search
CPC .. B60N 2/0232; B60N 2/0244; B60N 2/0248; B60N 2002/0272; H02P 5/68
USPC .............................................. 318/3
See application file for complete search history.

(56) References Cited

U.S. PATENT DOCUMENTS

| | | | |
|---|---|---|---|
| 2008/0109140 A1* | 5/2008 | Hozumi ............... | B60N 2/0244 701/49 |
| 2010/0181814 A1* | 7/2010 | Lachenmann ....... | B60N 2/0244 297/217.4 |
| 2020/0156483 A1* | 5/2020 | Kaneko ................. | B60L 50/10 |
| 2020/0262326 A1* | 8/2020 | Honda .................. | B60N 2/002 |

FOREIGN PATENT DOCUMENTS

KR   10-2017-0071117 A   6/2017

* cited by examiner

*Primary Examiner* — Gabriel Agared
(74) *Attorney, Agent, or Firm* — Bridgeway IP Law Group, PLLC; Jihun Kim

(57) ABSTRACT

Proposed are a plurality of motors respectively performing seat control functions and a plurality of switching elements provided to supply the plurality of motors with power, in which the plurality of motors are connected to share at least a part of the switching elements.

10 Claims, 6 Drawing Sheets

| FIRST EMBODIMENT | | | | |
|---|---|---|---|---|
| COMBINATION NO | M1 | M2 | M3 | M4 |
| 1 | CW | CCW | CW | CCW |
| 2 | CW | CCW | CW | STOP |
| 3 | CW | CCW | STOP | CW |
| 4 | CW | CCW | STOP | STOP |
| 5 | CW | STOP | CCW | CCW |
| 6 | CW | STOP | CCW | STOP |
| 7 | CW | STOP | STOP | CW |
| 8 | CW | STOP | STOP | CCW |
| 9 | CW | STOP | STOP | STOP |
| 10 | CCW | CW | CCW | CW |
| 11 | CCW | CW | CCW | STOP |
| 12 | CCW | CW | STOP | CCW |
| 13 | CCW | CW | STOP | STOP |
| 14 | CCW | STOP | CW | CCW |
| 15 | CCW | STOP | CW | STOP |
| 16 | CCW | STOP | STOP | CW |
| 17 | CCW | STOP | STOP | CCW |
| 18 | CCW | STOP | STOP | STOP |
| 19 | STOP | CW | CCW | CW |
| 20 | STOP | CW | CCW | STOP |
| 21 | STOP | CW | STOP | CCW |
| 22 | STOP | CW | STOP | STOP |
| 23 | STOP | CCW | CW | CCW |
| 24 | STOP | CCW | CW | STOP |
| 25 | STOP | CCW | STOP | CW |
| 26 | STOP | CCW | STOP | STOP |
| 27 | STOP | STOP | CW | CCW |
| 28 | STOP | STOP | CW | STOP |
| 29 | STOP | STOP | CCW | CW |
| 30 | STOP | STOP | CCW | STOP |
| 31 | STOP | STOP | STOP | CW |
| 32 | STOP | STOP | STOP | CCW |
| 33 | STOP | STOP | STOP | STOP |

FIG. 5

SEAT CONTROL DEVICE AND CONTROL METHOD THEREOF

CROSS REFERENCE TO RELATED APPLICATION

The present application claims priority to Korean Patent Application No. 10-2020-0143333, filed Oct. 30, 2020, the entire contents of which is incorporated herein for all purposes by this reference.

BACKGROUND OF THE INVENTION

Field of the Invention

The present invention relates to a seat control device and a control method thereof mounted in a vehicle.

Description of the Related Art

Vehicles are provided with functions to control seats into a variety of positions to accommodate the needs of occupants and provide more engaging seating comfort.

A vehicle seat is typically provided with functions such as a sliding function of moving the seat forward and backward, a height function of controlling the height of a seat cushion, a tilt function of controlling seat cushion inclination, and a reclining function of controlling seatback angle.

In addition, a memory seat function of saving particular settings preferred by an occupant and automatically controlling the seat into the settings is also provided.

Implementing the various seat control functions as described above requires a plurality of motors, along with a plurality of switching elements for driving the plurality of motors and an increase in the cross-sectional area of wiring that supplies electricity thereto, which becomes an important contributor to the increased cost, weight and package size, and the like of the vehicle.

The matters described above as the technical background are intended only for a better understanding of the background of the present invention and should not be taken as an acknowledgment that they correspond to the conventional art already known to those with common knowledge in the related art.

SUMMARY OF THE INVENTION

The present invention aims to provide a seat control device and a control method thereof that allow implementation of the equivalent level of seat control functions while reducing the number of switching elements and wiring for driving motors that implement the vehicle seat control functions of the present invention, thereby reducing the cost and weight and downsizing the seat package to significantly improve the merchantability of the vehicle seat ultimately.

In order to achieve the object as described above, the seat control device according to the present invention includes a plurality of motors respectively performing seat control functions; and a plurality of switching elements provided to supply the plurality of motors with power, wherein the plurality of motors are connected to share at least a part of the switching elements with each other.

The plurality of motors may be connected in series; the shared switching elements may be connected between motors connected adjacent to each other; and the shared switching elements may be composed of high side switching elements and low side switching elements.

The plurality of motors may be connected in series to form a closed loop; the shared switching elements may be connected between motors connected to each other; and the shared switching elements may be composed of high side switching elements and low side switching elements.

The plurality of motors may form a plurality of groups connected in series; and the motors connected to each other in series in one group may be connected to share the switching elements with the motors in other groups between motors connected adjacent to each other and at either end of the group.

Of the shared switching elements, the switching elements shared between the groups may be composed of high side switching elements.

Of the shared switching elements, the switching elements shared between the groups may be composed of low side switching elements.

In addition, in order to achieve the object as described above, the seat control device control method includes determining whether two or more operation signals are simultaneously input when operation signals for performing the seat control functions are input; calculating simultaneously drivable combinations according to current input operation signals from a driving table if two or more operation signals are simultaneously input; selecting, of the simultaneously drivable combinations, a combination in which the largest number of motors may be driven; and simultaneously driving the pertinent motors according to the selected combination.

The present invention may include sequentially driving the motors respectively corresponding to the input operation signals when no simultaneously drivable combination is available in the driving table calculating the simultaneously drivable combination.

In addition, the seat control device control method for achieving the objects as described above includes recognizing current positions of the motors corresponding to respective control target portions of the seat when memory seat operation signals are input; calculating driving requirements of respective motors based on differences between the current positions and the target positions of the respective motors; calculating a scenario in which the driving requirements of the motors may be met in the shortest time by using respective combinations in the driving table; and driving the motors according to the calculated scenario.

The present invention may further include checking whether all the driving requirements of the motors are met after the motors are driven according to the scenario; selecting a drivable combination of motors of which further driving is required from the driving table when all the driving requirements of the motors are not met; and further driving the pertinent motors according to the selected combination.

The present invention allows the implementation of the equivalent level of seat control functions while reducing the number of switching elements and wiring for driving motors that implement the vehicle seat control function, thereby reducing the cost and weight and downsizing the seat package to significantly improve the merchantability of a vehicle seat ultimately.

BRIEF DESCRIPTION OF THE DRAWINGS

FIG. 5 is a view showing an example of a driving table of the first device embodiment of the seat control device of the present invention.

DETAILED DESCRIPTION OF THE INVENTION

Figure 1:
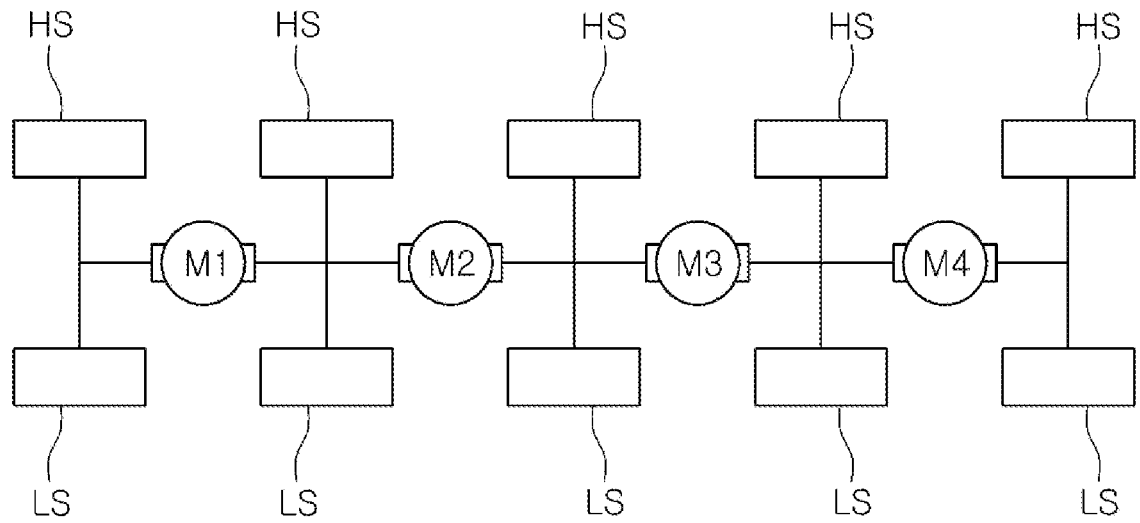
FIG. 1 is a view showing a first device embodiment of a seat control device according to the present invention.

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments according to the present invention may be modified in various ways and have various forms, specific embodiments will be illustrated in the drawings and described in detail in the present specification or application. However, this is not intended to limit the embodiments according to the concept of the present invention to a specific disclosure form and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present invention. Singular expressions include plural expressions unless the context explicitly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood by those with common knowledge in the art to which the present invention belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present invention will be described in detail by describing preferred embodiments of the present invention with reference to the accompanying drawings. The same reference numerals shown in each drawing indicate the same members.

Figure 2:
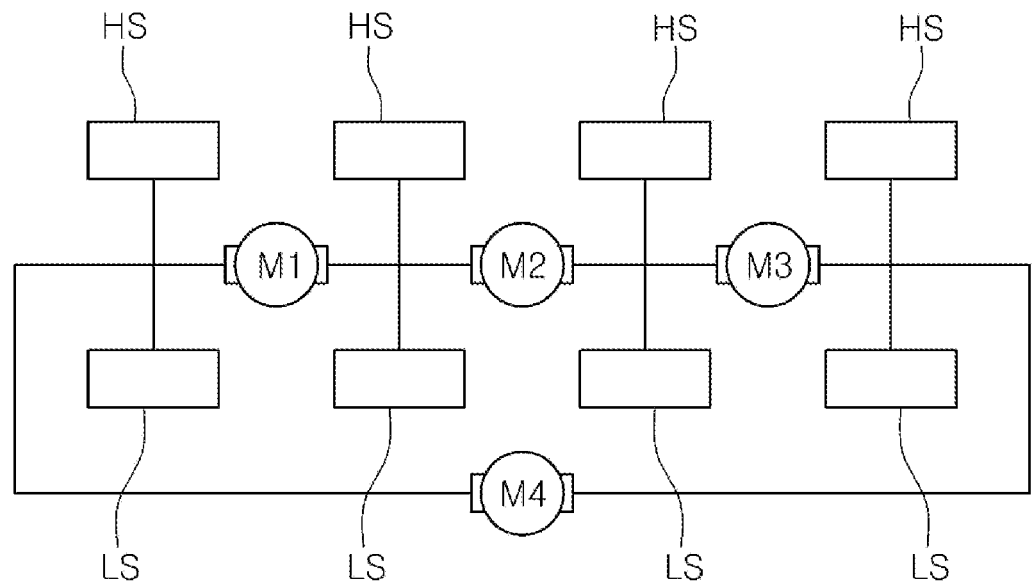
FIG. 2 is a view showing a second device embodiment of a seat control device according to the present invention.
Figure 3:
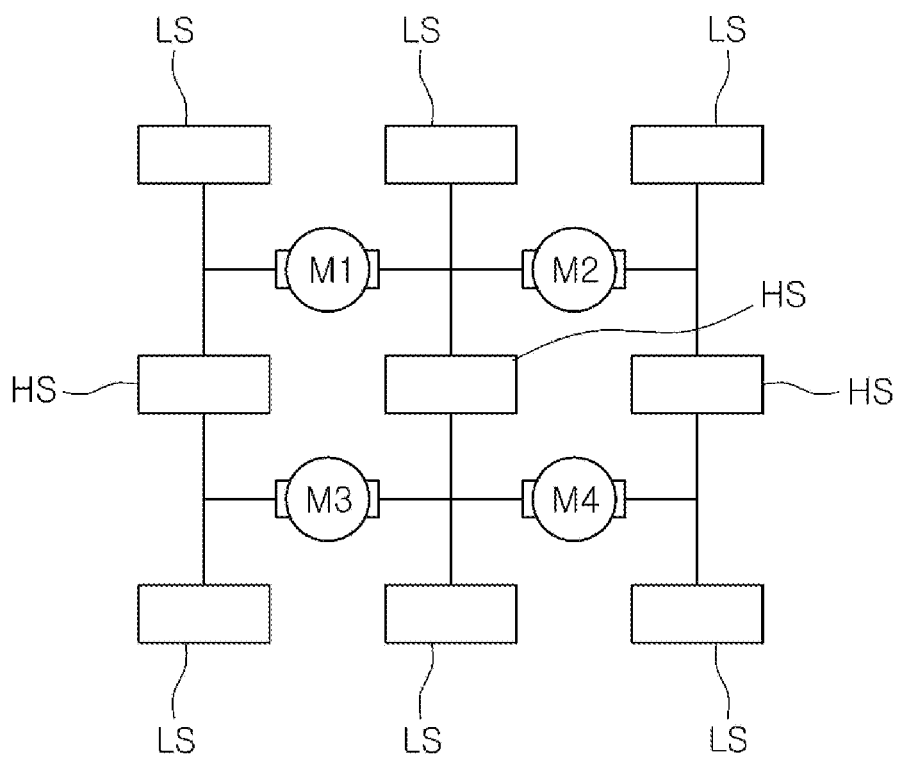
FIG. 3 is a view showing a third device embodiment of a seat control device according to the present invention.

FIGS. 1 to 3 show that embodiments of a seat control device according to the present invention commonly include a plurality of motors, M1, M2, M3, and M4, respectively performing seat control functions and a plurality of switching elements, HS and LS, provided to supply the plurality of motors with power, and the plurality of motors are connected to share at least a part of the switching elements.

That is, four switching elements must be connected to respective motors to drive the motors in the forward and reverse directions, but the embodiments of the present invention share a part of the switching elements so that only ten switching elements are provided to drive four motors in a first device embodiment, only eight switching elements are required in a second device embodiment, and only nine switching elements are required in a third device embodiment, thereby reducing the number of switching elements compared with the conventional motor control structure in general where 16 switching elements are required for driving four motors.

Reduction in the number of required switching elements as described above leads to reduction in the number, and cross-sectional area, of the wiring connecting drivers to the switching elements, which enables overall reduction of cost, weight, and package size of the seat.

Note that the seat control functions respectively performed by the motors include, for example, a sliding function of moving the seat forward and backward with respect to the vehicle body, a height function of controlling the height of a seat cushion, a tilt function of controlling the inclination of a seat cushion, a reclining function of controlling the angle of a seatback, etc.

In the case of the first device embodiment in FIG. 1, the plurality of motors, M1, M2, M3, and M4, are connected in series; the shared switching elements, HS and LS, are connected between the motors connected adjacent to each other; and the shared switching elements are composed of high side switching elements HS and low side switching elements LS.

Therefore, in the first device embodiment, a total of ten switching elements, HS and LS, are required to drive the four motors, M1, M2, M3, and M4, as described above.

Note that the high side switching elements HS are connected to the positive terminal of the DC power supply and the low side switching elements LS are connected to the negative terminal. The high side switching elements HS and the low side switching elements LS may be composed of a metal oxide semiconductor field effect transistor (MOSFEWT), etc.

In the case of the second device embodiment in FIG. 2, a plurality of motors, M1, M2, M3, and M4, are connected in series to form a closed loop; the shared switching elements are connected between the motors connected adjacent to each other; and the shared switching elements are composed of high side switching element HS and a low side switching element LS.

Therefore, in the second device embodiment, a total of eight switching elements, HS and LS, are required to drive the four motors, M1, M2, M3, and M4, as described above.

In the case of the third device embodiment in FIG. 3, the plurality of motors, M1, M2, M3, and M4, form a plurality of groups connected in parallel; the motors connected to each other in series in one group are connected to share the switching elements, HS and LS, with motors in another group between the motors connected adjacent to each other and at either end of the respective group. As a non-limiting and illustrative example, a first group can include M1 and M2, and a second group can include M3 and M4, and the first group and second group are connected in parallel.

That is, the groups of motors connected to each other in series are arranged in a grid shape as shown in FIG. 3 and, along with the motors, the switching elements are also arranged in a grid shape to be shared.

Therefore, in the third device embodiment, a total of nine switching elements, HS and LS, are required to drive the four motors, M1, M2, M3, and M4, as described above.

In FIG. 3, the switching elements shared between the groups are composed of high switching elements HS, but a reverse configuration is also possible.

That is, of the shared switching elements, the switching elements shared between the groups may be composed of low side switching elements LS.

A method of controlling a seat control device in which a plurality of motors for performing various seat control functions are configured to share the switching elements with each other as described above will be described.

Hereinafter, a seat control device control method based on the first device embodiment will be described.

Figure 4:
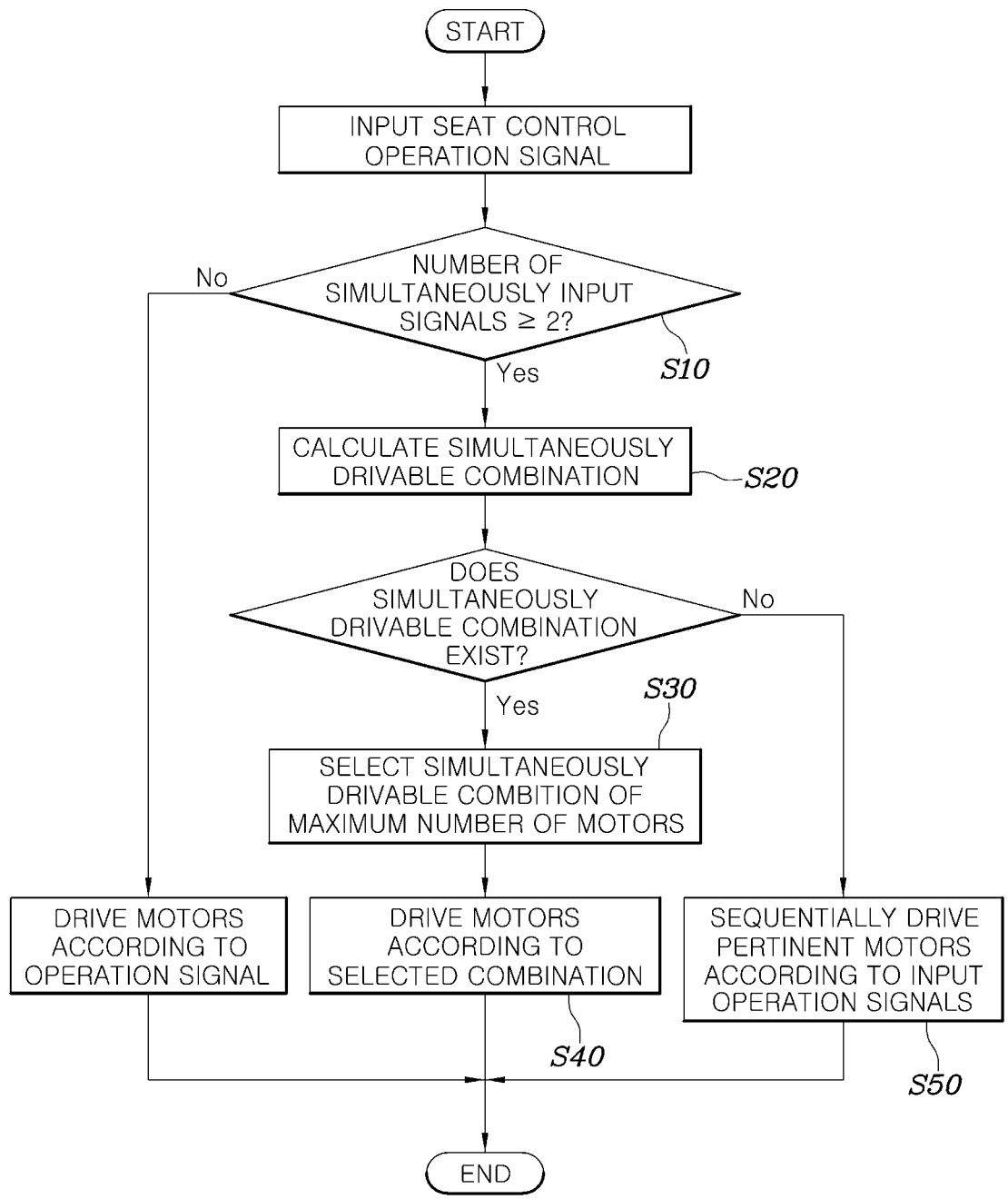
FIG. 4 is a flowchart showing a first method embodiment of a seat control device control method according to the present invention.

FIG. 4 shows that the first method embodiment of the seat control device control method of the present invention includes determining whether two or more operation signals are simultaneously input when operation signals for performing the seat control functions are input (S10); calculating simultaneously drivable combinations according to current input operation signals from a driving table if two or more operation signals are simultaneously input (S20); selecting, of the simultaneously drivable combinations, a combination in which the largest number of motors may be simultaneously driven (S30); and simultaneously driving the pertinent motors according to the selected combination (S40).

That is, according to the control method of the present invention as described above, since the motors provided to respectively perform separate seat control functions are controlled through shared switching elements, the motors are driven according to a particular combination selected from the driving table when two or more operation signals are simultaneously input.

The driving table summarizes both a case where simultaneous driving is possible and a case where simultaneous driving is impossible depending on the connection structure of the motors and the switching elements configured as described above. The first device embodiment may be configured as shown in FIG. 5.

Note that M1, M2, M3, and M4 respectively refer to motors, while CW (clockwise) and CCW (counterclockwise) respectively refer to forward and reverse rotations.

According to the present invention, when a user simultaneously inputs a plurality of operation signals and a plurality of simultaneously drivable combinations with respect to the input operation signals exist in the driving table, a combination in which the largest number of motors may be simultaneously driven is selected from among the combinations, and the motors are driven according to the selected combination so that the needs of the user are accommodated as immediately as possible.

Figure 6:
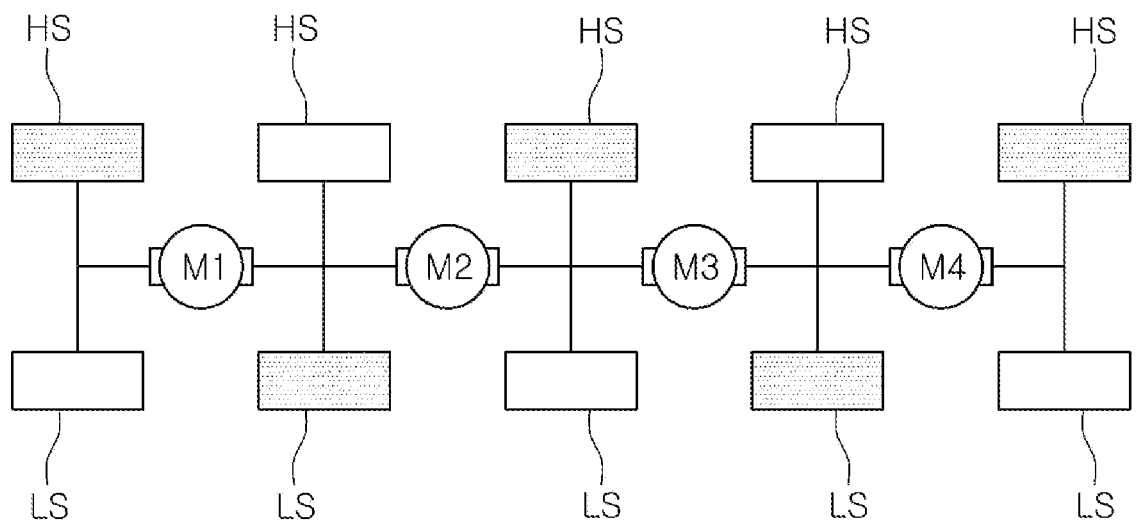
FIG. 6 is a view describing a driving example of the motors in the first device embodiment of the seat control device of the present invention.

For example, when the hatched switching elements as shown in FIG. 6 are considered to be turned on, the first motor M1 may perform a forward rotation, the second motor M2 may perform a reverse rotation, the third motor M3 may perform a forward rotation, and the fourth motor M4 may perform a reverse rotation. This setting corresponds to combination 1 in FIG. 5.

In a case where the first motor M1 performs a sliding function, the second motor M2 performs a height function, a third motor M3 performs a tilt function, and the fourth motor M4 performs a reclining function respectively such that the forward rotation corresponds to a forward sliding and the reverse rotation corresponds to a backward sliding for the first motor M1, the forward rotation corresponds to a height-up and the reverser rotation corresponds to a height-down for the second motor M2, the forward rotation corresponds to a tilt-up and a reverse rotation corresponds to a tilt-down for the third motor M3, and the forward rotation corresponds to a reclining forward tilt and a reverse rotation corresponds to a backward tilt for the fourth motor M4, when the user simultaneously operates for a forward sliding and a height-up, the first motor M1 may perform the forward rotation and the second motor M2 may performs the reverse rotation simultaneously and the other motors are in stationary states so that the first motor M1 and the second motor M2 are driven according to a combination 4 in the driving table and the needs of the user are immediately accommodated.

Meanwhile, when calculation of a simultaneously drivable combination reveals that no simultaneously drivable combination is available in the driving table, the pertinent motors are sequentially driven according to the input operation signals (S50).

Figure 7:
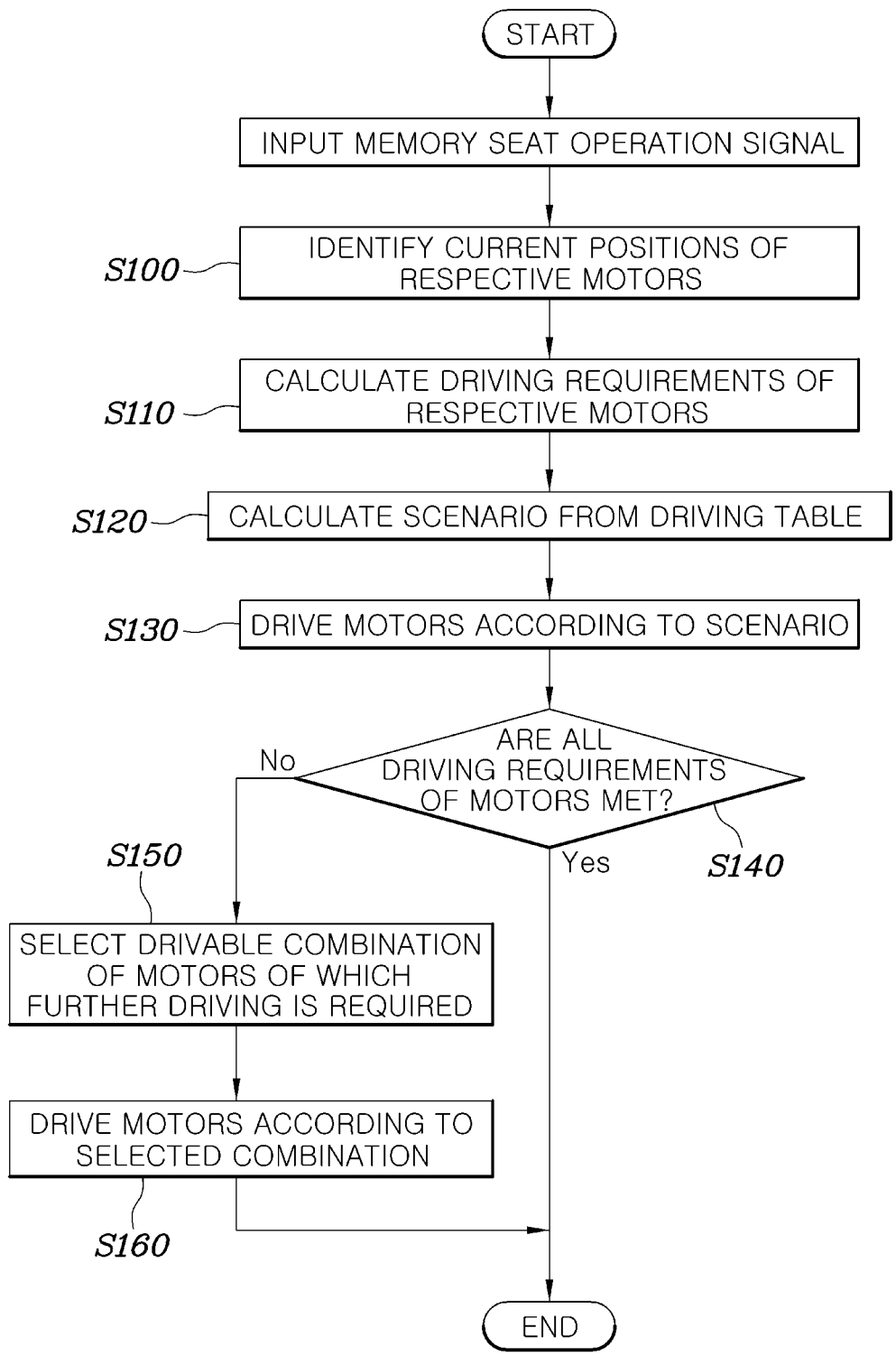
FIG. 7 is a flowchart showing a second method embodiment of the seat control device control method according to the present invention.

FIG. 7 shows that a second method embodiment of the seat control device control method of the present invention includes recognizing current positions of the motors corresponding to respective control target portions of the seat when memory seat operation signals are input (S100); calculating driving requirements of the respective motors based on differences between the current positions and the target positions of the respective motors (S110); calculating a scenario in which the driving requirements of the motors may be met in the shortest time by using respective combinations in the driving table (S120); and driving the motors according to the calculated scenario (S130).

That is, when a user operates memory seat switches to move respective portions of the seat to the memorized target positions, driving requirements of the respective motors are calculated based on the differences between the current positions and the target positions of respective motors, a scenario in which the driving requirements may be met in the shortest time is calculated from the driving table, and the motors are sequentially driven according to the calculated scenario so that the seat may be controlled to the memorized position needed by the user as soon as possible.

Here, the driving requirements of the motors are meant to include all physical quantities that may represent the rotation amount of the motors such as motor driving time, Hall sensor pulses, etc. and refer to a quantity, along with the directionality taken into consideration, indicating in what directions and how much the motors should rotate.

For example, when the user inputs the memory seat operation signals and the driving requirements of the motors calculated based on the differences between the current positions and the target positions of the respective motors are determined as shown in Table 1, a scenario as shown in Table 2 may be calculated.

TABLE 1

| Backward sliding (M1) | Height-up (M2) | Tilt-up (M3) | Reclining backward tilt (M4) |
|---|---|---|---|
| 70 seconds (CCW) | 30 seconds (CW) | 25 seconds (CW) | 120 seconds (CCW) |

TABLE 2

|  | Step 1 | Step 2 | Step 3 | Step 4 | Step 5 |
|---|---|---|---|---|---|
| Motor operation | Backward sliding starts. Tilt-up starts. | Tilt-up is completed in 25 seconds. Backward sliding Continues. Height-up. Starts. Backward reclining starts. | Height-up is completed in 30 seconds. Backward sliding continues. Backward reclining continues. | Backward sliding is completed in 15 seconds. Backward reclining operation. | Backward reclining is completed in 75 seconds. |
| Driving combination | No. 15 M1 CCW (70 seconds) M3 CW (25 seconds) | No. 12 M1 CCW (45 seconds) M2 CW (30 seconds) M4 CCW (120 seconds) | No. 17 M1 CCW (15 sec) M4 CCW (90 sec) | No. 32 M4 CCW (75 seconds) |  |

That is, the scenario consists of a total of five steps. In step 1, using the combination 15 in the driving table, the first motor M1 is driven into a reverse rotation to start a backward sliding of the seat while the third motor M3 is driven into a forward rotation to start a tilt-up of the seat.

The tilt-up by the third motor M3 is completed when the step 1 is executed for 25 seconds, and then, the operation is switched to step 2 to use the combination 12 in the driving table, whereby the second motor M2 is driven in the forward direction to start a height-up while the first motor M1 is kept driven in the reverse direction, and the fourth motor M4 is driven in the reverse direction to start a reclining backward tilt in the step 2.

Since the height-up is completed when the step 2 is executed for 30 seconds, the operation is switched to step 3, the step 2 is stopped, and the first motor M1 and the fourth motor M4 are kept driven. At this time, the first motor M1 is required to be driven for another 15 seconds and the fourth motor M4 is required to be driven for another 90 seconds.

Since the backward sliding of the seat by the first motor M1 is completed when the step 3 is executed for 15 seconds, the operation is switched to step 4, the first motor M1 is stopped, and the remaining fourth motor M4 is driven alone. The fourth motor M4 is required to be driven for another 75 seconds.

Since the reclining forward tilt of the seat by the fourth motor M4 is completed when the step 4 is executed for 75 seconds, the control of the seat into the memorized setting selected by the user is completed.

Note that the step 5 in Table 2 is a step of checking that the seat control is completed as described above, and the scenario is practically completed when execution is done up to the step 4.

Meanwhile, FIG. 7 shows that the present invention may further include checking whether all the driving requirements of the motors are met after the motors are driven according to the scenario (S140); selecting from the driving table a drivable combination of motors of which further driving is required when all the driving requirements of the motors are not met (S150); and further driving the pertinent motors according to the selected combination (S160).

That is, when all the driving requirements are not met even though the respective motors were driven according to the scenario and driving of the motors is completed according to the scenario, like in a case where an excessive load is locally applied to a certain motor, a drivable combination of motors of which further driving is required is selected and the pertinent motors are further driven to complete the seat control into a memorized setting as per request.

Using as many motors as possible to control the seat into a memorized setting as per request as soon as possible as described above, seat control functions that minimize the limits of the seat control device of the present invention caused by the shared use of the switching elements and quickly meet the needs of users as much as possible may be provided.

Specific embodiments of the present invention are illustrated and described, but it will be self-evident to those with common knowledge in the related art that the present invention may be improved upon and modified in various ways within the scope not departing from the technical spirit of the present invention provided by the patent claims below.

What is claimed is:
1. A vehicle seat control device comprising:
a plurality of motors respectively performing seat control functions; and
a plurality of switching elements configured to supply the plurality of motors with power,
wherein the plurality of motors are connected to share one or more of the plurality of switching elements,
wherein the shared one or more switching elements are connected between the respective plurality of motors connected adjacent to each other, and the shared one or more switching elements include one or more high side switching elements and one or more low side switching elements, and wherein when both one of two high side switching elements connected to one of the plurality of motors and one of two low side switching elements connected to the one of the plurality of motors are turned on to drive the one of the plurality of motors, the one of the plurality of motors is configured to perform a forward rotation or a reverse rotation.

2. The vehicle seat control device according to claim 1, wherein the plurality of motors are connected in series.

3. The vehicle seat control device according to claim 1, wherein the plurality of motors are connected in series to form a closed loop.

4. The vehicle seat control device according to claim 1, wherein the plurality of motors includes a first group of motors and a second group of motors, the first and second groups being connected in parallel, wherein the first group of motors and the second group of motors are respectively connected in parallel, and wherein the shared one or more switching elements are connected to one or more motors of the first group and one or more motors of the second group.

5. The vehicle seat control device according to claim 4, wherein, the shared one or more switching elements between the first and second groups are composed of one or more high side switching elements.

6. The vehicle seat control device according to claim 4, wherein, the shared one or more switching elements between the first and second groups are composed of one or more low side switching elements.

7. A vehicle control method using the seat control device according to claim 1, the method comprising:

determining whether two or more operation signals are simultaneously input when operation signals for performing seat control functions are input to operate a plurality of motors;

calculating simultaneously drivable combinations according to the simultaneously input two or more operation signals from a driving table;

selecting, of the simultaneously drivable combinations, a combination in which a largest number of motors of the plurality of motors are simultaneously driven; and driving the motors according to the selected combination.

8. The vehicle control method according to claim 7, comprising sequentially driving the respective plurality of motors according to the input operation signals when the simultaneously drivable combinations are not available in the driving table.

9. The vehicle control method using the seat control device according to claim 1, the method comprising:

recognizing current positions of a plurality of motors corresponding to respective control target portions of a seat when memory seat operation signals are input;

calculating driving requirements of the respective plurality of motors based on differences between the current positions and target positions of the respective motors;

calculating a scenario in which the driving requirements of the plurality of motors are met in a shortest time by using combinations in a driving table; and driving the plurality of motors according to the calculated scenario.

10. The vehicle control method according to claim 9 further comprising:

checking whether the driving requirements of the plurality of motors are met after driving the plurality of motors according to the calculated scenario is performed;

selecting a simultaneously drivable combination of one or more of the plurality of motors of which further driving is required from the driving table when the driving requirements of the plurality of motors are not met; and further driving the one or more motors according to the selected combination.

* * * * *